MAGNETIC AMPLIFIER

Filed Jan. 10, 1951

2 Sheets-Sheet 1

INVENTORS
SIDNEY B. COHEN
JEROME BENTKOWSKY
BY R. J. Craddock
ATTORNEY

INVENTORS
SIDNEY B. COHEN
JEROME BENTKOWSKY
BY L. V. Craddock
ATTORNEY

United States Patent Office 2,745,908
Patented May 15, 1956

2,745,908

MAGNETIC AMPLIFIER

Sidney B. Cohen and Jerome Bentkowsky, Brooklyn, N. Y., assignors to Sperry Rand Corporation, a corporation of Delaware Application January 10, 1951, Serial No. 205,368

4 Claims. (Cl. 179—171)

The present invention relates to a magnetic amplifier which is designed to operate in a phase-sensitive manner to provide an alternating current output having a phase sense dependent upon the polarity or phase sense of an input signal voltage and having an amplitude dependent upon or proportional to the magnitude of the signal voltage.

It is a primary object of this invention to provide a magnetic amplifier of the foregoing character which is characterized by the fact that it has extremely high gain, a gain of the order of twice that which may be achieved with present magnetic amplifiers of comparable weight and bulk.

Another object resides in providing a magnetic amplifier which comprises a plurality of saturable reactors including cores of permeable magnetic material having load (power or anode) windings thereon and a unilateral current conducting device in series circuit with each load winding, each series connected load winding and unilateral current conducting device constituting a circuit arm and the circuit arms being connected together in a double bridge-like fashion.

A further object resides in providing a magnetic amplifier in which feedback windings provide opposing fluxes in the cores of the reactors which may function to improve the response or, alternatively, the stability of the amplifier or the servomotor loop which may embody such an amplifier.

Heretofore, magnetic amplifiers providing an alternating current output have required the use of a center-tapped transformer or choke for feeding the loading windings of the amplifier from an alternating current power source. This becomes a distinct disadvantage where compactness and weight must be reduced or maintained at a minimum. It is therefore a still further object of this invention to provide a magnetic amplifier providing an alternating current output which by virtue of the construction and relative arrangement of parts eliminates all need for a center-tapped input transformer or choke and which furthermore is characterized by its compactness and lightness in weight.

With the foregoing and still other objects in view, our invention includes the novel elements and the combinations and arrangements thereof described below and illustrated in the accompanying drawings, in which Fig. 1 schematically represents one arrangement of the saturable reactors employed in the amplifier of the present invention;

Figure 4:
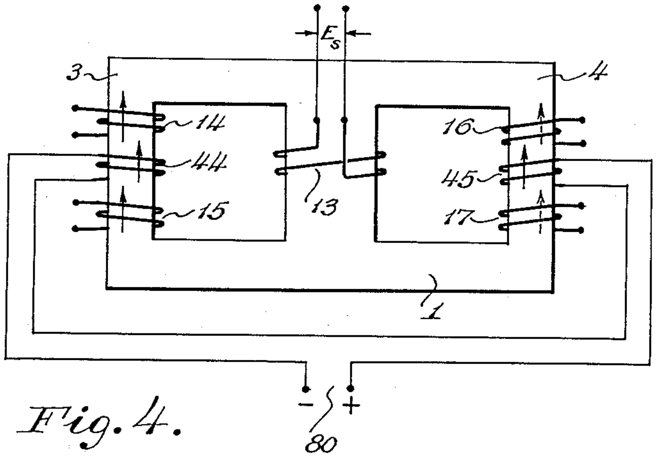
Figure 5:
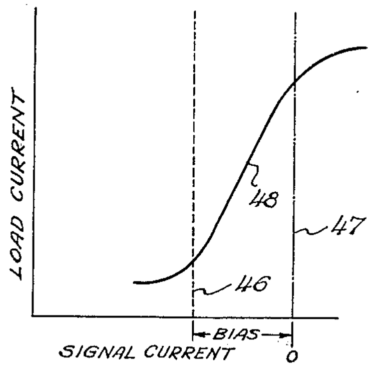
Figure 6:
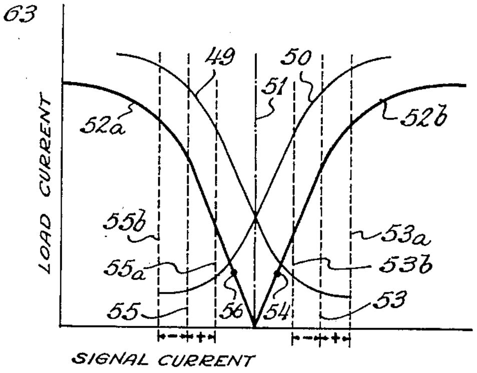
Figure 7:
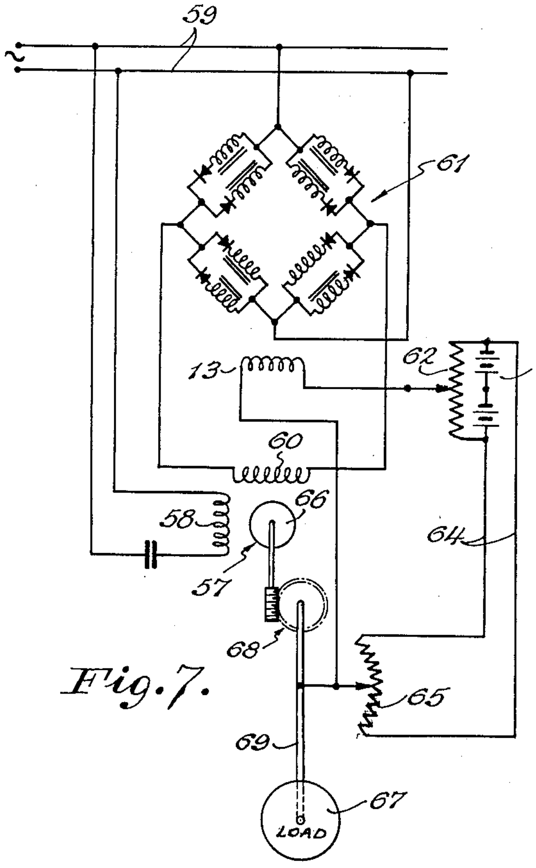

Fig. 4 schematically represents a further modification of the invention;

Fig. 5 depicts a characteristic or transfer curve of the magnetic material employed in the cores of the saturable reactors;

Fig. 6 illustrates by the use of characteristic or transfer curves how a balanced amplifier of the present invention functions to provide phase-sensitive operation; and Fig. 7 schematically illustrates a servomotor system embodying the novel amplifier of this invention.

Briefly, it will be understood that the amplifier of the present invention comprises a plurality of saturable reactors including cores of high permeability, magnetic material having a signal winding and load windings mounted on said cores. The windings herein referred to as load windings are sometimes referred to as power windings or anode windings. Each load winding has a unilateral current conducting device such as a rectifier connected in series therewith to form a circuit arm, and the circuit arms are connected together in a double bridge-like fashion so that current may flow in opposite directions through respective arms of the bridge and a load connected thereto while current will flow in but one direction through each circuit arm.

Figure 1:
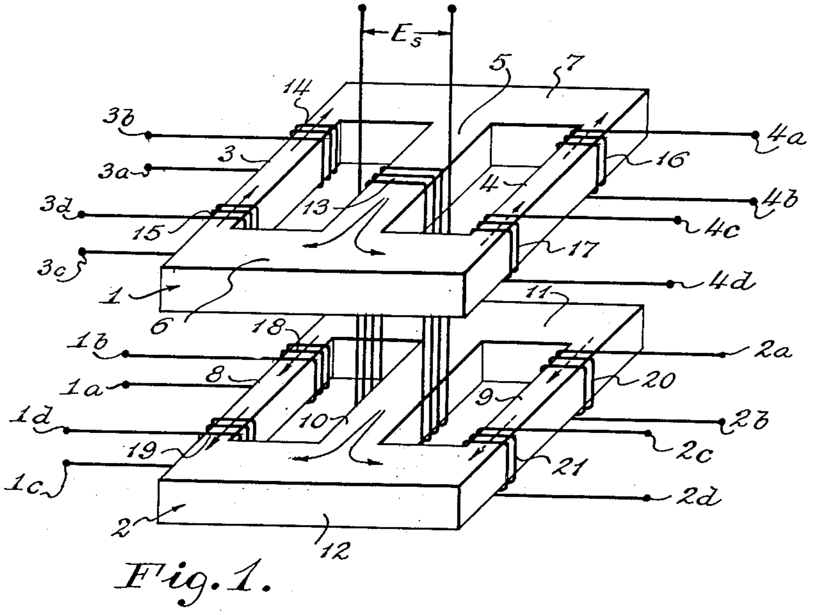

As illustrated in Fig. 1, one form of our present amplifier embodies two three-legged cores indicated generally at 1 and 2. Separate cores for the load windings, of course, may be employed. These cores are preferably formed of high permeability magnetic materials. For balanced amplifier operation, two cores having as nearly identical magnetic properties as possible are chosen. Each core comprises a central core leg and two outer core legs all of which are joined together at their ends to form closed magnetic paths. For example, core 1 comprises the outer legs 3 and 4, the central leg 5, and end pieces 6 and 7 which join the legs together at opposite ends thereof. Similarly, core 2 comprises the outer legs 8 and 9, central leg 10 and end pieces 11 and 12.

Upon each outer leg of each of the cores 1 and 2 are mounted a pair of load windings while a signal winding 13 is mounted to surround the two central core legs 5 and 10. The core leg 3 of core 1 carries load windings 14 and 15; core leg 4 of core 1 carries load windings 16 and 17, core leg 8 of core 2 carries load windings 18 and 19; and core leg 9 carries load windings 20 and 21.

Figures 2, 3:
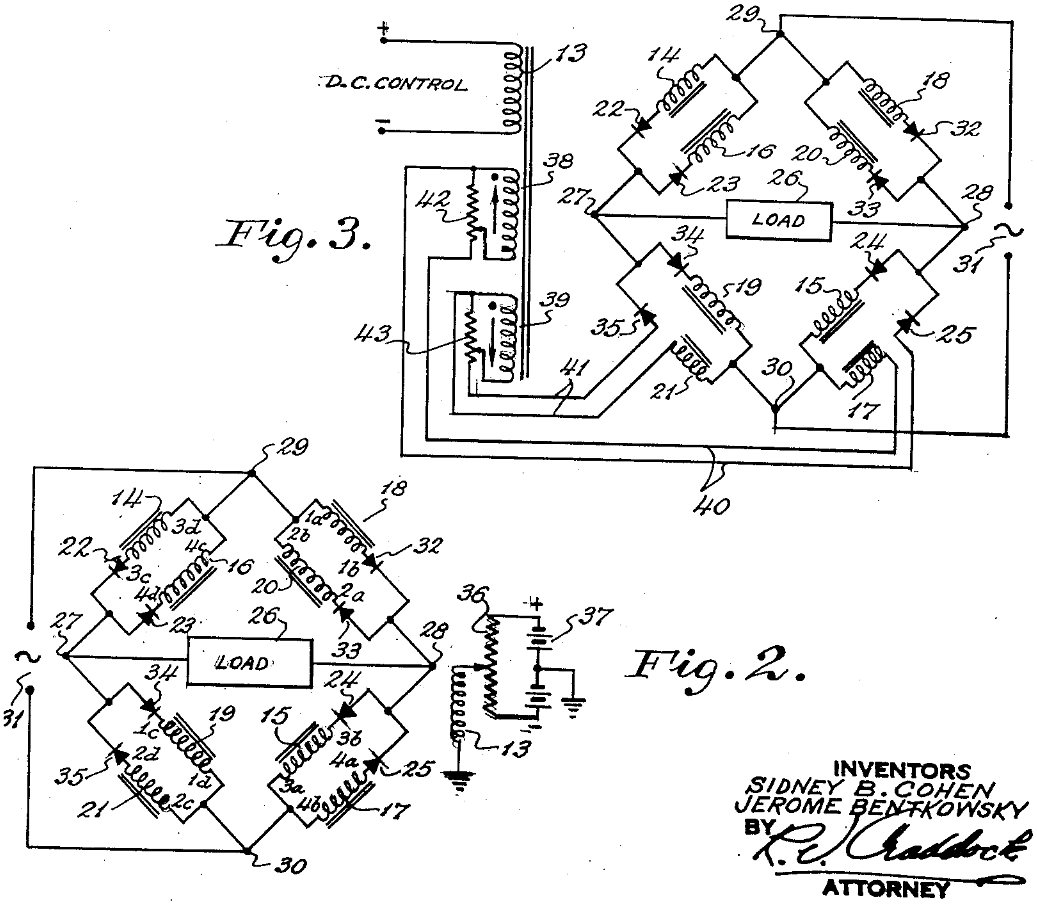
Fig. 2 is a wiring diagram of a preferred form of the present invention.
Fig. 3 is a wiring diagram similar to Fig. 2 but illustrating a modification.

As above pointed out, the load windings are each connected in series circuit with a unilateral current conducting device which is herein illustrated and described as a rectifier to form circuit arms, and these arms are connected together in a double bridge-like fashion to provide an alternating current output. This arrangement is illustrated in Fig. 2 wherein it will be seen that load winding 14 is connected in series with a rectifier 22 to form one circuit arm and load winding 16 is connected in circuit with a rectifier 23 to form a second circuit arm. These circuit arms are connected together in parallel to form one arm of a double bridge. In a similar manner, load winding 15 is connected in series with a rectifier 24 and load winding 17 is connected in series with a rectifier 25 to form a parallelly connected pair of circuit arms which in turn form a second arm of the bridge diagonally opposite the first described bridge arm. It will be noted that the rectifiers 22 and 23 in one bridge arm permit current flow in opposite directions through the associated load windings and this is true of the two rectifiers illustrated in the second bridge arm hereinabove described. Therefore, current in load winding 14 may pass in one direction through the bridge arm embodying the same while current through load winding 16 may pass in the opposite direction. Likewise, current may pass through load winding 15 in one direction and the current in load winding 17 will be in the opposite direction. Since the above described bridge arms represent diagonally opposite ones in the double bridge, it is evident that alternating current may flow through the load 26 which is connected across one diagonal of the bridge represented by the terminals 27 and 28. The other diagonal of the bridge represented by terminals 29 and 30 is adapted to be connected across an alternating current power source such as that indicated at 31.

Referring to Fig. 1, it will be seen that the load windings 14 and 15 are mounted on the same outer leg 3 of the upper core 1 while the load windings 16 and 17 are mounted on the other outer leg 4 of the upper core winding. The load windings 14 and 15 are disposed to produce fluxes in the direction indicated by the solid line arrows on the half cycle of the power supply when rectifiers 22 and 24 permit current to pass therethrough and it will be noted that current flows through both of these windings on the same half cycle of the power supply. The windings 16 and 17 pass current during the opposite half cycle of power supply and the fluxes produced thereby in the core 1 will have the direction indicated by the dotted line arrows. Therefore, if a signal voltage is supplied to the control winding 13 to produce a flux in the center core leg 5 in the direction represented by the solid line arrows, the signal flux will aid the fluxes produced by the windings 14, 15 and 16, 17 on alternate half cycles of the power supply and hence an increased current will flow through the two arms of the bridge comprising these windings. As pointed out below, under these assumed conditions, the currents in the other two arms of the bridge will be reduced thereby resulting in a flow of alternating current in the load 26 which has a phase sense dependent upon the polarity of the signal voltage applied to the signal winding and also having an amplitude dependent upon the magnitude of the control signal voltage.

To accomplish the foregoing result, the bridge must be unbalanced and this is accomplished in the following manner. The load windings 18 and 20 which are mounted on the lower core 2 are connected in series respectively with rectifiers 32 and 33. These circuit arms are connected in parallel and between the bridge terminals 28 and 29 to form a third bridge arm. The remaining load windings 19 and 21 on the lower core 2 are connected in series respectively with rectifiers 34 and 35 to form circuit arms which are parallelly connected between bridge terminals 27 and 30 to form the fourth arm of the bridge. In Fig. 2, the control signal winding 13 is illustrated for exemplary purposes as connected to the wiper arm of potentiometer 36 which is connected across a source of unidirectional voltage such as a battery 37 having its center tap grounded for reversible polarity control purposes.

Referring again to Fig. 1, it will be seen that the load windings 18 and 19 which lie in diagonally opposite arms of the bridge and which pass current on the same half cycle of the alternating power supply are mounted on the outer leg 8 of core 2 to produce fluxes in the same direction therein as illustrated by the full line arrow. The windings 20 and 21, also in diagonally opposite arms of the bridge, pass current on the opposite half cycle of the power supply and produce fluxes in the direction represented by the dotted line arrows. The full line arrows in the center leg 10 of core 2 represent the direction of the control flux which is in the same direction as described with respect to core 1 for the assumed polarity of signal voltage. In the case of the lower core 2, the signal flux will oppose the fluxes produced by the load windings 18 and 19 on one half cycle of the power supply and will oppose the fluxes produced by the windings 20 and 21 on the other half cycle of the power supply. Therefore, the current flow through the two arms of the double-bridge comprising the power windings 18, 19, 20 and 21, will be reduced for the same polarity of signal voltage which produced an increase in current flow in the other two arms of the bridge. When the polarity of the signal voltage reverses, of course, the opposite will occur, the bridge being unbalanced in an opposing sense and therefore reversing the phase of the alternating current flowing in the load 26.

The ends of each pair of load windings have been denoted by corresponding reference characters in both Figs. 1 and 2 to show the manner in which they are interconnected in double bridge-like fashion.

From the foregoing it should be evident that the double bridge magnetic amplifier of the present invention will have extremely high gain, a gain increase of approximately 100% being achieved over former known types of magnetic amplifiers of comparable size. Furthermore, no center tapped input choke or transformer is required and therefore considerable saving in weight is achieved. It will also be noted that an amplifier of the foregoing character may be controlled by an alternating current signal as well as by a unidirectional current signal, as shown in our copending application Serial No. 213,254.

In Fig. 3 we have shown a modification of the present invention wherein the load windings and associated rectifiers are connected in a double bridge-like fashion and feedback windings are connected in two arms of the bridge to provide either damping when connected degeneratively or increased gain when connected regeneratively. These feedback windings are indicated at 38 and 39, winding 38 being connected through leads 40 in series with the power winding 17 and rectifier 25 and feedback winding 39 being connected through leads 41 in series with power winding 21 and rectifier 35. The winding 38 may be connected across a potentiometer 42 and winding 39 across a potentiometer 43 to control the amount of feedback. Preferably, the feedback windings 38, 39 are mounted on the center legs of the two cores in much the same manner as the control winding 13 and the fluxes produced thereby are in bucking relation as illustrated by the full line arrows. With degenerative feedback, the predominating flux produced by the feedback windings 38, 39 will be in a direction to decrease the output of the bridge to thereby produce a more slowly rising transfer curve, representing the load current with respect to the signal current, and to damp the system. The opposite, of course, will occur if the feedback windings act in a regenerative fashion.

In Fig. 4 we have illustrated a further modification wherein bias windings are applied to the core structures to shift the zero signal axes to a desired point along the transfer or load to signal current curves of the cores, the bias in effect determining the zero signal value of flux density or degree of flux saturation in the cores. In Fig. 5 we have illustrated a curve which is plotted in load current values with respect to signal current values. This curve for all intents and purposes may be called the transfer curve for one arm of the bridge. In Fig. 4 wherein we have shown but one core, the bias windings 44 and 45, which are supplied from any suitable source of D. C. bias 80, are mounted on the outer legs of the core, and it will be understood that similar windings may be mounted on the core 2. These bias windings preferably supply a unidirectional flux in the direction of the solid line arrows associated therewith to move the axis 46 in Fig. 5 to the full line position 47 thereof. When a signal is supplied, the flux density in the cores will experience excursions along the curve 48 to the right and left of the axis 47, dependent on the polarity of the signals, instead of to the right and left of the dash line axis 46. The load current, of course, varies in a similar manner.

For balanced amplifier operation, the saturable reactors are connected in such manner that the relationship expressed by the load current-signal current curves 49 and 50 in Fig. 6 will obtain. In this figure, the curves 49 and 50 represent the currents in opposite halves of the bridge which normally are equal when no signal is present and provide zero current output. The axis 51 represents the phase reversal axis for the amplifier output, the load current output of the bridge being of one phase when to the right of the axis 51 and of the opposite phase sense when to the left of said axis. The curves **52*a* and 52*b* represent the output of the balanced bridge amplifier. Since the currents represented by curves 49 and 50 are respectively in opposite phase senses, the output of the amplifier represented by the junction point of curves 52a and 52b on axis 51 will be zero for zero signal voltage. For a signal voltage of one polarity such as that represented by dash line 53a to the right of axis 53, corresponding to axis 47 of Fig. 5, the difference between the load currents in the arms of the bridge will be that represented for example by point 54 on curve 52b and of one phase sense since the same signal will bias the other core to the dash line 55a. For a signal voltage of opposite polarity but of the same magnitude, the cores will be biased as represented by dash lines 53b and 55b, and the net load current will be that represented for example by point 56 on curve 52a which is equal to that represented by point 54 but of opposite phase sense. The spacings between the lines or axes 53, 53a and 53b and 55, 55a and 55b** are equal since the same magnitude of signal voltage has been assumed.

A magnetic amplifier employing saturable reactors working about the axis 46 in Fig. 5 may be operated in balanced fashion in a manner similar to that shown in Fig. 6 but in this case the load current curves will not merge in a sharp V at the zero signal axis 51 indicating high response for small signals but will be somewhat rounded, crossing the zero signal axis in a substantially perpendicular manner. This results in an amplifier having poorer response characteristics.

In Fig. 7 we have shown an exemplary servomotor system embodying the double bridge-type magnetic amplifier of the present invention. The servomotor indicated generally at 57 is a two phase motor, one phase winding 58 of which is connected across the power supply mains 59 and the other phase winding 60 being connected across the output of the double bridge magnetic amplifier indicated generally at 61. The amplifier is of the character hereinabove described in which one diagonal thereof is connected across the load or motor winding 60 while the other diagonal is connected across the power supply mains 59. The control winding 13 of amplifier 61 is connected to a signal voltage source herein illustrated as a potentiometer 62 which is connected across a unidirectional current source such as batteries 63. Batteries 63 are illustrated as connected by leads 64 to a potentiometer 65 which constitutes a position repeatback signal generator. The rotor 66 of motor 57 drives a load 67 by means of suitable shafting and gearing indicated generally at 68 and the load shaft 69 is schematically illustrated as driving the wiper arm of potentiometer 65.

Assuming that potentiometer 62 operates as the primary input signal source, it may be considered as being operated by an input member, not illustrated, whose position is to be repeated or followed at the load 67. When a signal is supplied from potentiometer 62 it will control amplifier 61 to provide an alternating current output having an amplitude proportional or dependent upon the magnitude of the unidirectional signal and the phase sense of the alternating current output of the amplifier, which is fed to the phase winding 60 of motor 57, will depend upon the polarity of the signal voltage. It will be understood that any suitable means such as phase adjusters or shifters may be supplied in circuit with either of the field windings of the motor 57 to provide currents in quadrature phase relation therein. The motor will therefore operate in a direction depending upon the phase relation of the current in winding 60 with respect to that of winding 58 and at a speed depending upon the amplitude of the current in winding 60, the current in winding 58 being of fixed amplitude and phase. The motor 66 driving load 67 will operate potentiometer 65 until it developes a signal of equal and opposite magnitude to that derived from potentiometer 62 and these two signals will combine to provide zero resultant signal voltage when the displacement of the load is the same at that of the input member.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnetic amplifier comprising a pair of three-legged cores, a pair of load windings on each outer leg of both cores and a signal winding on the center legs thereof, unilateral current conducting devices respectively connected one in series with each load winding to form a circuit arm and said circuit arms being connected in parallel pairs in a double bridge-like fashion, said circuit arms being adapted for connection to an alternating current source, said load windings being so relatively arranged on said two cores that the fluxes in each core produced by the pairs of load windings thereon will flow in the same direction on alternate half cycles of said alternating current source in the center leg thereof while the fluxes in the center legs of the two cores during each half cycle will be in bucking relation with respect to the signal winding thereon to thereby eliminate induced feedback voltages in the signal winding.

2. A magnetic amplifier comprising four circuit branches connected to form a bridge, a power source of A. C. potential connected across one diagonal of the bridge, a load connected across the other diagonal of the bridge, each of said circuit branches including a serially connected load winding and rectifier connected in parallel with another serially connected load winding and rectifier, said rectifiers being oppositely poled in each branch to permit current flow in both directions therethrough but in opposite directions only through the individual windings of each branch, a pair of three-legged cores, a signal winding on the center legs of said cores, and a source of D. C. potential connected to energize said signal winding, the load windings of one pair of opposite branches being wound in pairs on the outer legs of one core while the load windings of the other pair of opposite branches are wound in pairs on the outer legs of the other core, the adjacent pairs of windings on each outer leg of one core being arranged thereon alternately on successive half cycles of said power source to produce fluxes in the center leg of such core in a direction aiding the flux produced therein by said signal winding, while the other adjacent pairs of windings on each outer leg of the other cores are arranged thereon alternately on successive half cycles of said power source to produce fluxes in the center leg of such other core in a direction bucking the flux produced therein by said signal winding.

3. The magnetic amplifier of claim 2 wherein a first feedback winding is connected in series with a load winding of one core, and a second feedback winding is connected in series with a load winding of the other core which is energized on the same half cycle of A. C. potential as said load winding of said one core, said feedback windings being wound one on each of the center legs of said cores so as to produce bucking fluxes relative to the signal winding on said center legs.

4. A magnetic amplifier comprising a pair of three-legged cores, a pair of load windings on each outer leg of both cores and a signal winding on the center legs thereof, a plurality of unilateral current conducting devices respectively connected one in series with each load winding to form a circuit arm, said circuit arms being connected in parallel pairs in a double bridge-like fashion so that current may flow in both directions in each arm of the bridge but in one direction only in each circuit arm, a source of A. C. potential connected across one diagonal of the bridge, a load connected across the other diagonal of the bridge, and a source of variable D. C. potential connected to energize said signal winding, one of the pair of load windings on each outer leg of each of said cores being located in a bridge arm opposite to the bridge arm in which the other of said pair of load windings is located, said load windings being wound on said core legs relative to each other and said signal winding such that each pair of windings on the outer legs of one core produces fluxes on alternate half cycles of said A. C. potential aiding the flux produced by the signal winding in said one core while each pair of windings on the outer legs of the other core produces fluxes on alternate half cycles bucking the flux produced by the signal winding in said other core, whereby a full wave alternating potential may be developed across said load to vary in amplitude in accordance with the magnitude of said D. C. potential and to reverse in phase with reversals in polarity of said D. C. signal while net current flow in said D. C. winding due to the currents in said load windings may be substantially prevented.

References Cited in the file of this patent

UNITED STATES PATENTS

| | | |
|---|---|---|
| 1,544,381 | Elmer et al. | June 30, 1925 |
| 1,914,220 | Sorensen et al. | June 13, 1933 |
| 2,164,383 | Burton | July 4, 1939 |
| 2,403,891 | Lamm | July 9, 1946 |
| 2,432,399 | Edwards | Dec. 9, 1947 |
| 2,464,639 | Fitzgerald | Mar. 15, 1949 |
| 2,509,738 | Lord | May 30, 1950 |